(12) United States Patent
Ishikawa et al.

(10) Patent No.: US 10,618,780 B2
(45) Date of Patent: Apr. 14, 2020

(54) CRANE

(71) Applicant: TADANO LTD., Kagawa (JP)

(72) Inventors: Iwao Ishikawa, Kagawa (JP); Yuji Tadano, Kagawa (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 16/465,001

(22) PCT Filed: Dec. 8, 2017

(86) PCT No.: PCT/JP2017/044234
§ 371 (c)(1),
(2) Date: May 29, 2019

(87) PCT Pub. No.: WO2018/105741
PCT Pub. Date: Jun. 14, 2018

(65) Prior Publication Data
US 2019/0292024 A1 Sep. 26, 2019

(30) Foreign Application Priority Data
Dec. 9, 2016 (JP) .................................. 2016-239900

(51) Int. Cl.
*G08B 21/00* (2006.01)
*B66C 13/16* (2006.01)
(Continued)

(52) U.S. Cl.
CPC .............. *B66C 13/16* (2013.01); *B66C 13/00* (2013.01); *B66C 23/36* (2013.01); *B66C 23/88* (2013.01);
(Continued)

(58) Field of Classification Search
CPC ......... B66C 13/16; B66C 13/00; B66C 23/88; B66C 23/36; B66C 2700/0371; E02F 9/26; B60R 2300/8093; B60R 1/00
See application file for complete search history.

(56) References Cited

U.S. PATENT DOCUMENTS 6,549,139 B2 * 4/2003 Shaw, Jr. ................ B66C 13/44
212/276
7,116,356 B2 * 10/2006 Peeples ................... B66C 13/46
348/207.99

FOREIGN PATENT DOCUMENTS

JP          2521244 Y2    12/1996
JP     2000-247572 A     9/2000
(Continued)

OTHER PUBLICATIONS

Jan. 16, 2018, International Search Report issued for related PCT Application No. PCT/JP2017/044234.
(Continued)

*Primary Examiner* — Howard D Brown, Jr.
(74) *Attorney, Agent, or Firm* — Paratus Law Group, PLLC

(57) ABSTRACT

Provided is a crane that can detect obstacles within a sufficient range while traveling and while doing work. A crane that is provided with an obstacle sensor that, during travel, detects the approach of obstacles toward a front side part of a travel body and, during work, detects the approach of obstacles toward a rear side part of a turning body. According to a first embodiment, the obstacle sensor has a detection range that is directed from front to rear. According to a second embodiment, the obstacle sensor has a detection range that is directed from rear to front.

5 Claims, 12 Drawing Sheets

(51) Int. Cl.
   *B66C 23/36*  (2006.01)
   *B66C 23/88*  (2006.01)
   *B66C 13/00*  (2006.01)
   *E02F 9/26*  (2006.01)
   *B60R 1/00*  (2006.01)

(52) U.S. Cl.
   CPC .................. *E02F 9/26* (2013.01); *B60R 1/00* (2013.01); *B60R 2300/8093* (2013.01); *B66C 2700/0371* (2013.01)

(56) References Cited

FOREIGN PATENT DOCUMENTS

| | | |
|---|---|---|
| JP | 2002-020074 A | 1/2002 |
| JP | 2016-013888 A | 1/2016 |
| JP | 2016-030891 A | 3/2016 |
| JP | 2016-056006 A | 4/2016 |

OTHER PUBLICATIONS

Jan. 16, 2018, International Search Opinion issued for related PCT Application No. PCT/JP2017/044234.

* cited by examiner

CRANE

CROSS REFERENCE TO PRIOR APPLICATION

This application is a National Stage Patent Application of PCT International Patent Application No. PCT/JP2017/044234 (filed on Dec. 8, 2017) under 35 U.S.C. § 371, which claims priority to Japanese Patent Application No. 2016-239900 (filed on Dec. 9, 2016), which are all hereby incorporated by reference in their entirety.

TECHNICAL FIELD

The present invention relates to a technology of detecting an obstacle during traveling and during operation by an obstacle sensor.

BACKGROUND ART

PTL 1 discloses a configuration provided with a first camera that forms an overhead view image and is disposed on an upper swivel body, and a second camera that includes a corner part from a rear end to a side part of the upper swivel body in a range of field, and rotates following the upper swivel body that is swiveling to take a through image, wherein the overhead view image and the through image are displayed on a display for monitoring the vehicle periphery of a hydraulic excavator.

CITATION LIST

Patent Literature

PTL 1
Japanese Patent Application Laid-Open No. 2016-30891

SUMMARY OF INVENTION

Technical Problem

Similarly to the technology described in PTL 1, a first camera and a second camera are provided in a crane, so that an obstacle can be detected during traveling. However, an attitude during crane operation is largely different from an attitude during crane traveling, a monitoring area and a collision pattern with an obstacle are also different, and therefore a problem that a sufficient operation range cannot be detected remains. For example, during traveling, collision patterns with an object to be monitored and an obstacle need to be considered in order to prevent catching at the time of turning right or left, and during operation, collision patterns with an object to be monitored and an obstacle need to be considered in order to prevent collision at the time of swiveling right or left.

An object of the present invention is to provide a technology enabling obstacle detection in a sufficient range, both during crane traveling and during crane operation.

Solution to Problem

An obstacle sensor is provided, which detects approach of an obstacle toward a front side part of a traveling body during traveling, and detects approach of an obstacle toward a rear side part of a swivel body during operation.

The obstacle sensor has a detection range from front to rear.

The obstacle sensor has a detection range from rear to front.

Advantageous Effects of Invention

According to the present invention, it is possible to perform obstacle detection in a sufficient range both during crane traveling and during crane operation.

DESCRIPTION OF EMBODIMENTS

Figure 1:
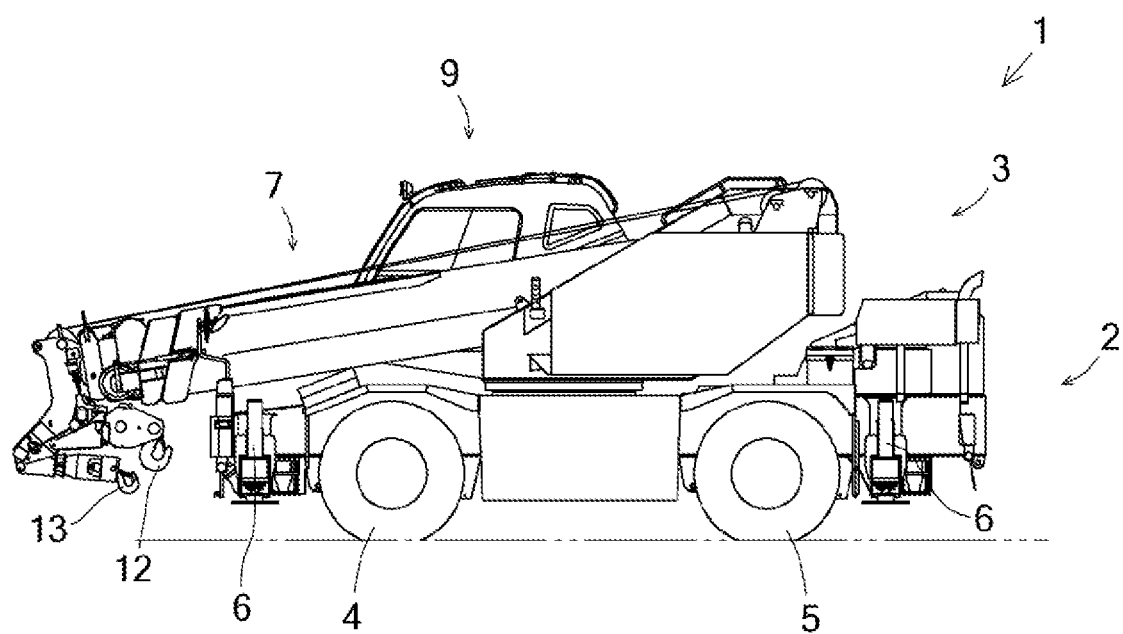
FIG. 1 is a side view during crane traveling.
Figure 2:
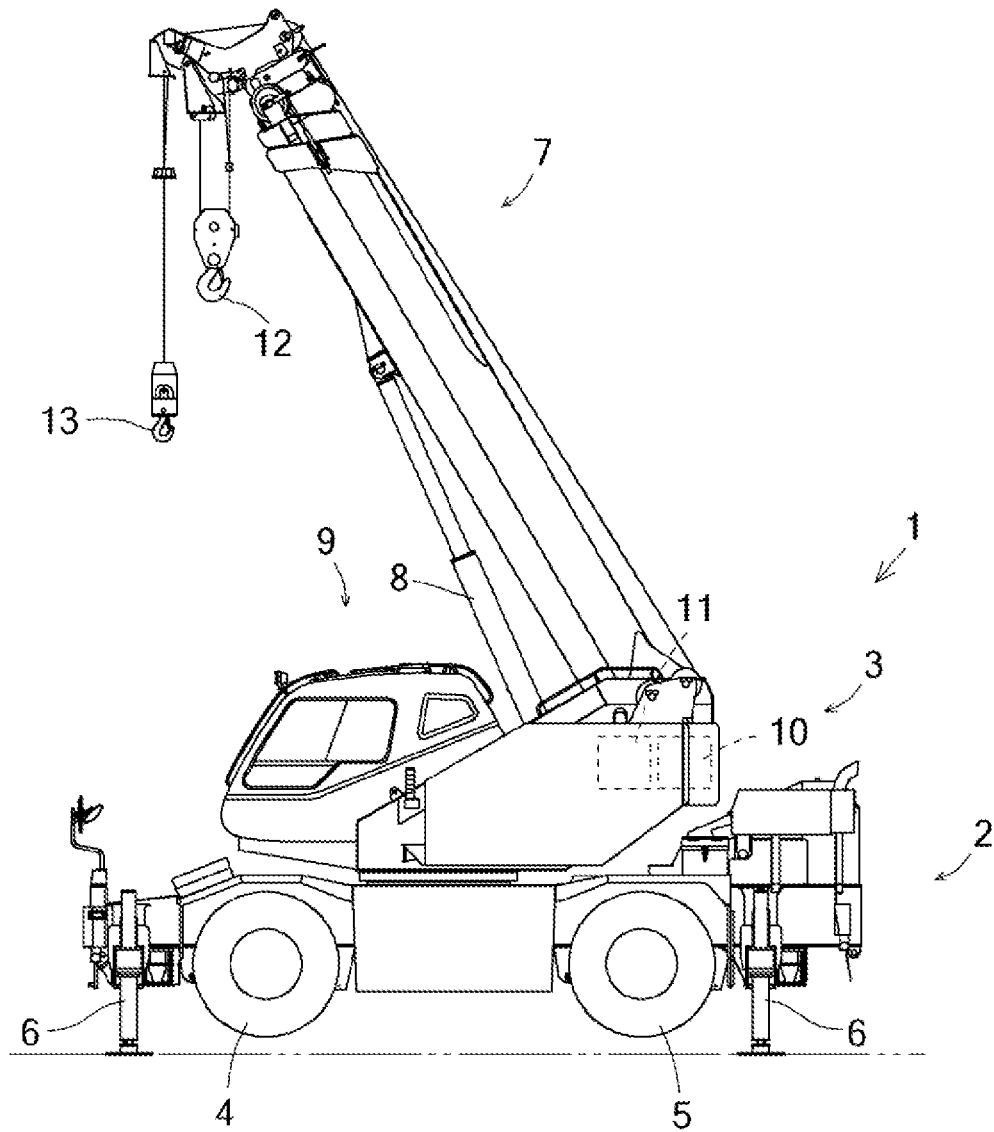
FIG. 2 is a side view during crane operation.

A whole configuration of a crane will be described with reference to FIG. 1 and FIG. 2. FIG. 1 is a side view during traveling of crane 1. FIG. 2 is a side view during operation of crane 1.

Crane 1 mainly includes traveling body 2, and swivel body 3.

Traveling body 2 includes a lateral pair of front tires 4, and a lateral pair of rear tires 5. Traveling body 2 includes outriggers 6 that are brought in contact with the ground and facilitate stabilization during hoisting operation. Traveling body 2 includes not only a hydraulic actuator for driving these elements but also an engine and a transmission.

Swivel body 3 includes boom 7 so as to protrude forward from a central rear part thereof. Boom 7 can be freely luffed by luffing cylinder 8 that is a hydraulic actuator, and can freely extend and retract in a multistage manner. Boom 7 is disposed at a lateral central part, and cabin 9 in which a driver's seat is installed is provided on the right of boom 7. In the following description, an embodiment in which cabin 9 is disposed on the right of boom 7 will be described. However, cabin 9 can be provided on the left of boom 7.

Swivel body 3 includes main winch 10 and sub-winch 11. Swivel body 3 includes main hook 12 and sub-hook 13. Main winch 10 can perform hoisting operation using main hook 12 by being rolled up or rolled down. Sub-winch 11 can perform hoisting operation using sub-hook 13 by being rolled up or rolled down.

During traveling of crane 1, luffing cylinder 8 is retracted to bring boom 7 into a state of being luffed down forward, and main hook 12 and sub-hook 13 are stored below boom 7 (refer to FIG. 1). During operation of crane 1, luffing cylinder 8 is extended to bring boom 7 into a state of being luffed up, storing of main hook 12 and sub-hook 13 is released, and various operation can be performed (refer to FIG. 2).

Figure 3:
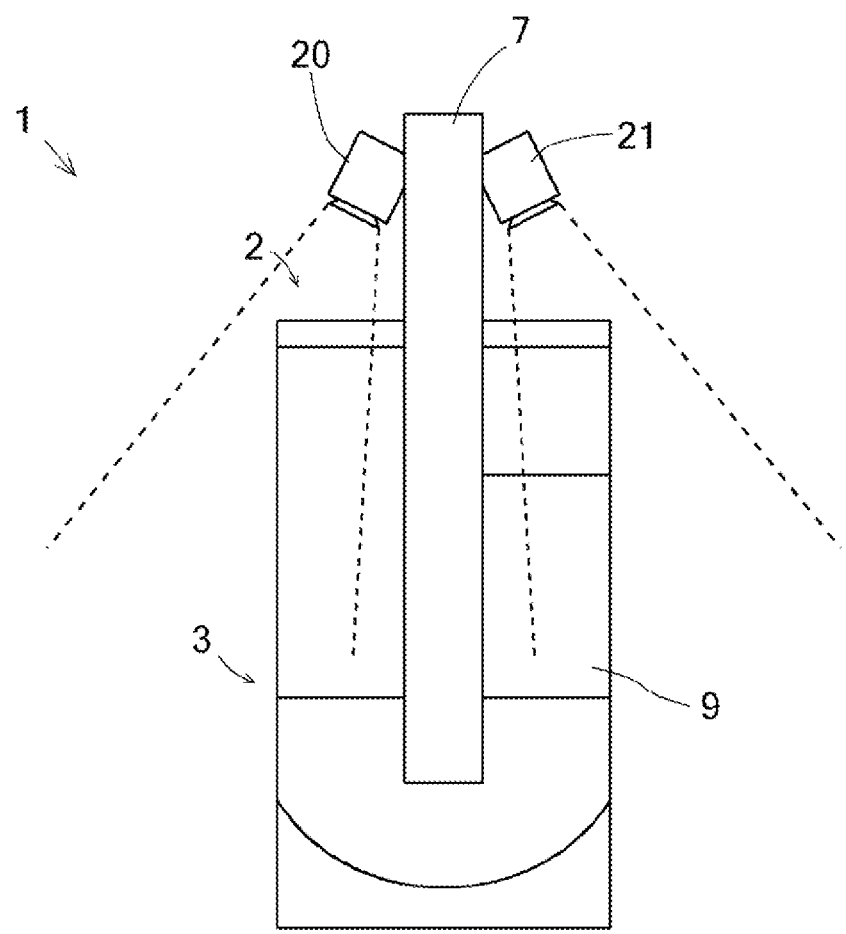
FIG. 3 is a diagram illustrating an embodiment of an obstacle detection by a crane.
Figure 4:
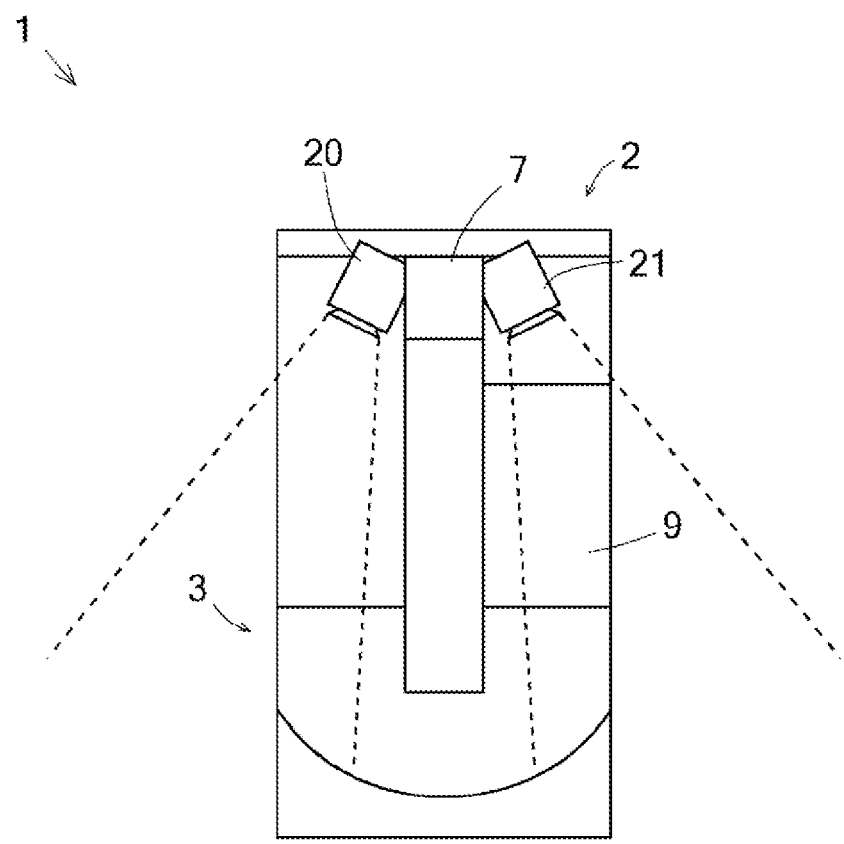
FIG. 4 is a diagram illustrating the embodiment of the obstacle detection by the crane.
Figure 5:
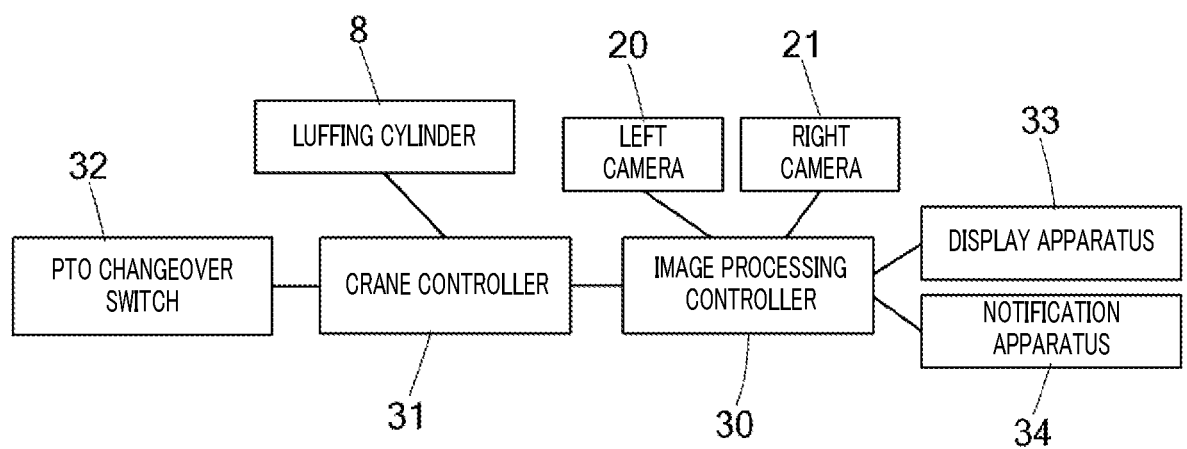
FIG. 5 is a block diagram illustrating a control configuration of the obstacle detection of the crane.
Figure 6:
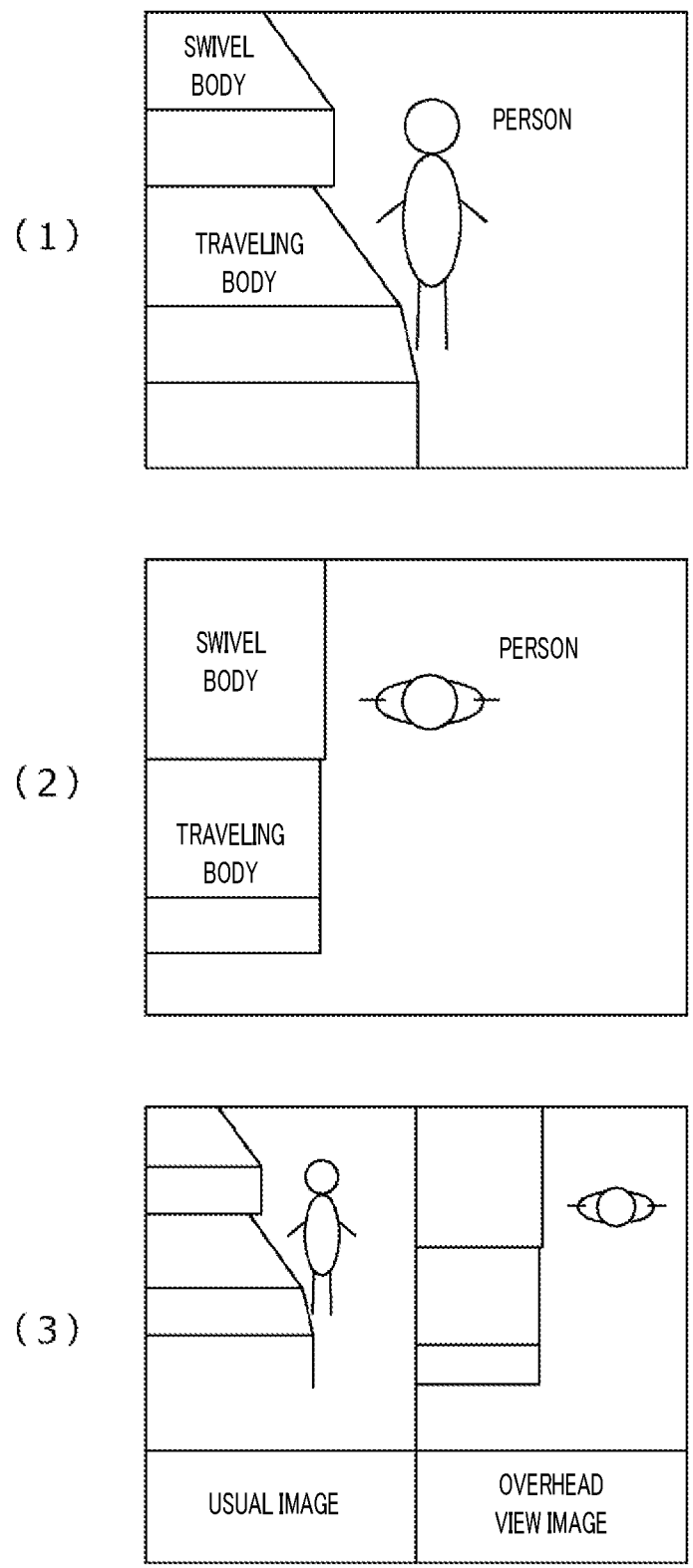
FIG. 6 illustrates display examples of a display apparatus.
Figure 7:
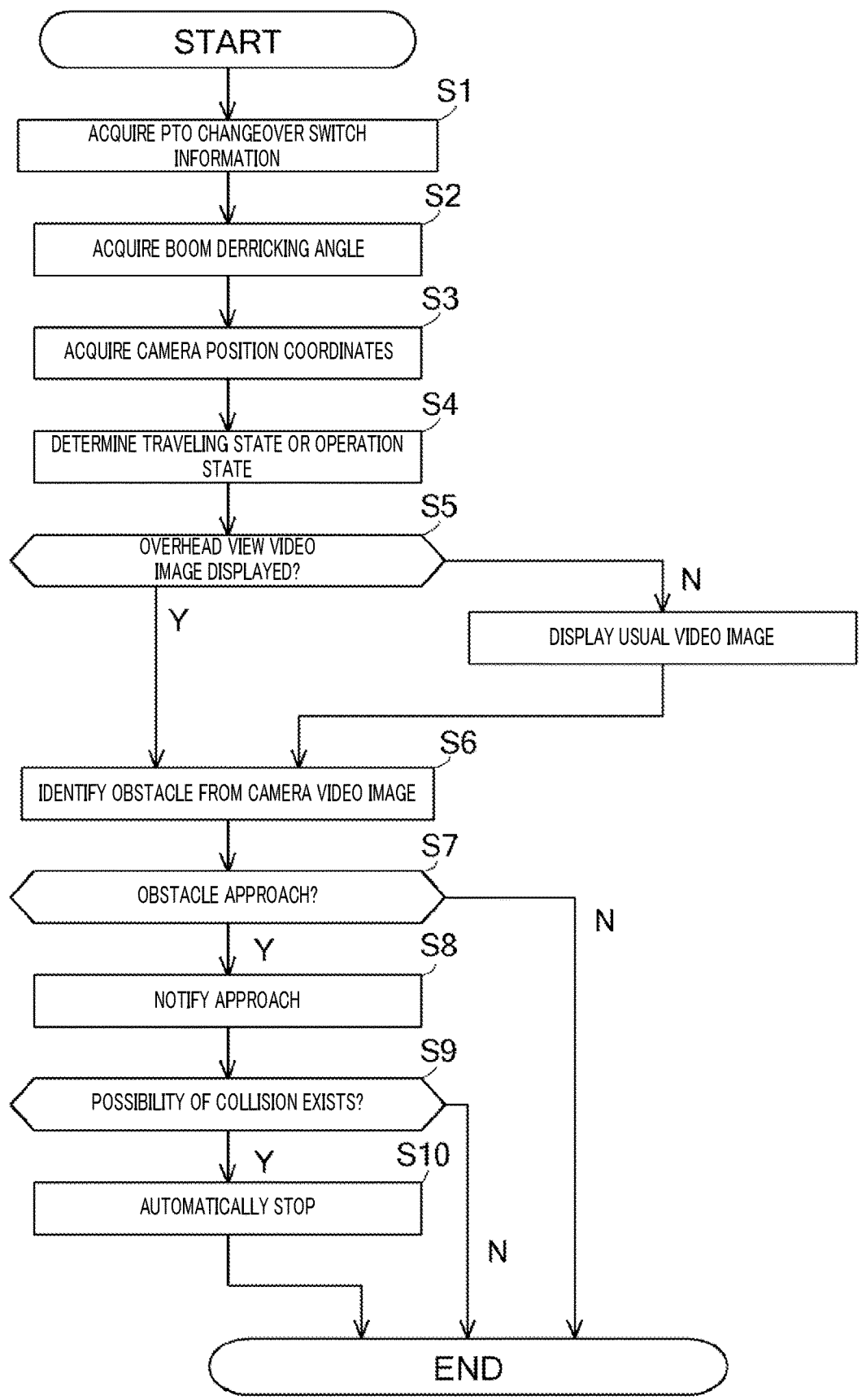
FIG. 7 shows a flow illustrating obstacle determination.

Obstacle detection in the surroundings of the crane will be described with reference to FIG. 3 to FIG. 7. FIG. 3 is a schematic diagram illustrating a state of obstacle detection during traveling of crane 1. FIG. 4 is a schematic diagram illustrating a state of obstacle detection during operation of crane 1. FIG. 5 is a control block diagram related to the obstacle detection in the surroundings of crane 1. FIG. 6 illustrates display examples of obstacle detection on a display apparatus. FIG. 7 shows a flow of obstacle determination.

As illustrated in FIG. 3 and FIG. 4, left camera 20 for acquiring a video image on the left of traveling body 2 and swivel body 3 is provided on a left end of a distal end of boom 7, and right camera 21 for acquiring a video image on the right of traveling body 2 and swivel body 3 is provided in a right end.

Left camera 20 is a first obstacle sensor (disposed toward the left of swivel body 3) provided on a side opposite to a side on which cabin 9 is disposed on swivel body 3, and left camera 20 is disposed such that an image-taking range (detection range) thereof becomes a range from the distal end of boom 7 toward a diagonally left rear side. Right camera 21 is a second obstacle sensor provided on the same side as cabin 9 (right of swivel body 3), and is disposed such that an image-taking range (detection range) thereof becomes a range from the distal end of boom 7 toward a diagonally right rear side. Thus, left camera 20 detects the left side from the lateral central part of crane 1, and right camera 21 detects the right side from the lateral central part of crane 1.

In a case in which cabin 9 is provided on the left of boom 7, right camera 21 disposed on the side opposite to the driver's seat becomes the first obstacle sensor, and left camera 20 disposed on the same side as the driver's seat becomes the second obstacle sensor.

As illustrated in FIG. 3, during traveling of crane 1, boom 7 is in a luffed-down state (refer to FIG. 1), and therefore left camera 20 acquires a video image of a front end and a left side of traveling body 2, and a left side of swivel body 3, and right camera 21 acquires a video image of the front end and the right side of traveling body 2, and the right side of swivel body 3. As illustrated in FIG. 4, during operation of crane 1, boom 7 is in an luffed-up state (refer to FIG. 2), and therefore left camera 20 acquires a video image of a rear part and a left side of swivel body 3, and right camera 21 acquires a video image of the rear part and a right side of swivel body 3.

Left camera 20 acquires the video image of the front end and the left side of traveling body 2, and the left side of swivel body 3, during traveling of crane 1. That is, left camera 20 disposed on the side opposite to the driver's seat, or cabin 9, detects existence of an obstacle at the time of turning left by detecting a condition of the left side by using the video image, the left condition being difficult to be visually checked from cabin 9 is detected. At this time, boom 7 is luffed down forward, the front end thereof is in a state of protruding in front of the front end of traveling body 2. Consequently, the video image of left camera 20 disposed on the front end of boom 7 is a video image taken from the front of traveling body 2 and swivel body 3, and an obstacle that exists on the left side of crane 1 is easily detected. Particularly, a front side part of traveling body 2 is captured by left camera 20, and an obstacle is detected, so that it is possible to prevent catching of the obstacle at the time of change of a course.

Similarly, during operation of crane 1, a condition of the left side and a left rear side of swivel body 3 that is difficult to be visually checked from cabin 9 is detected by using the video image, so that existence of an obstacle during swiveling is detected. During operation, boom 7 is in a state of being luffed up, and the video image acquired by left camera 20 is such an angle as to overlook swivel body 3. Consequently, an obstacle that exists on the left side of swivel body 3 is easily detected. Thus, left camera 20 that can check a condition on a side opposite to cabin 9 is disposed, so that it is possible to perform obstacle detection in a sufficient range both during traveling and during operation. Particularly, left camera 20 captures a rear side part of swivel body 3 to detect an obstacle, so that it is possible to prevent collision with the obstacle during swiveling.

As described above, by checking the video image acquired by left camera 20 as the first obstacle sensor, it is possible during traveling to avoid collision with an obstacle due to catching at the time of turning left, and it is possible during operation to avoid collision with an obstacle in a rear left part at the time of swiveling right. That is, in obstacle detection of the left side that is located on the side opposite to the driver's seat, and has a limited visual field, collision with an obstacle can be avoided both during traveling and during operation by the single obstacle sensor.

As described above, a feature of the present crane including: a traveling body, a swivel body; a boom provided so as to protrude forward from a central rear part of the swivel body, and provided so as to be able to be freely luffed by a hydraulic actuator; and a driver's seat disposed on a single side of the boom, in which a first obstacle sensor that detects an obstacle on a side opposite to the driver's seat from a distal end of the boom toward the diagonally rear side is provided, and the first obstacle sensor detects approach of an obstacle toward a front side part of the traveling body, during traveling, and detects approach of an obstacle toward a rear side part of the swivel body, during operation.

Thus, according to the first obstacle sensor from the boom distal end toward the diagonally rear side, that is, the obstacle sensor having a detection range from front to rear, during traveling in the luffed-down state of the boom, lateral sides of the traveling body and the swivel body from the front side are detected, so that existence of an obstacle at the time of change of a course of the traveling body is satisfactorily detected. Additionally, during operation in the luffed-up state of the boom, the lateral sides of the traveling body and the swivel body are detected from the upper side, so that existence of an obstacle can be satisfactorily detected when the swivel body swivels.

Crane 1 of this embodiment further includes right camera 21. During traveling of crane 1, right camera 21 acquires a video image of the front end of traveling body 2, and right sides of traveling body 2 and swivel body 3. That is, a condition of the right side that is difficult to be visually checked from cabin 9 is detected by using the video image, so that catching of an obstacle at the time of turning right is detected. A camera angle at this time is an angle from the front side similarly to left camera 20, and an obstacle that exists on the right side of crane 1 is easily detected.

During operation of crane 1, a condition of the right side and the right rear side of swivel body 3 that is difficult to be visually observed from cabin 9 is detected by using the video image, so that collision with an obstacle during swiveling is detected. A camera angle at this time is an angle from the upper side similarly to left camera 20, and an obstacle that exists around swivel body 3 is easily detected. Thus, right camera 21 capable of covering the condition on the same side as cabin 9, particularly, the dead angle of cabin 9 is also disposed, so that obstacle detection in a sufficient range both during traveling and during operation can be performed.

As described above, by checking the video image acquired by right camera 21 as the second obstacle sensor, it is possible during traveling to avoid collision with an obstacle due to catching at the time of turning right, and it is possible during operation to avoid collision with an obstacle at a right rear part at the time of swiveling left. That is, in obstacle detection on the right side that is the same side as the driver's seat, collision with an obstacle both during traveling and during operation can be avoided by the single obstacle sensor.

As described above, according to a further feature of the present crane, a second obstacle sensor that detects an obstacle on the same side as the driver's seat from the distal end of the boom toward the diagonally rear side is provided, and the second obstacle sensor detects approach of an obstacle toward a front side part of the traveling body, during traveling, and detects approach of an obstacle toward a rear side part of the swivel body, during operation. Thus, the second obstacle sensor that detects an obstacle on a side opposite to the first obstacle sensor is provided as an obstacle sensor having a detection range from front to rear, so that an obstacle around the crane can be detected by the two obstacle sensors.

As illustrated in FIG. 5, left camera 20 and right camera 21 are electrically connected to image processing controller 30, and video image data acquired by each camera is transmitted to image processing controller 30. Image processing controller 30 processes video images acquired by left camera 20 and right camera 21, and identifies an obstacle such as a person and a vehicle included in the video images by image processing.

Image processing controller 30 is electrically connected to crane controller 31. Crane controller 31 controls a crane apparatus. Crane controller 31 is electrically connected to luffing cylinder 8 and PTO changeover switch 32, and acquires information related to the attitude (luffing angle) of boom 7, and existence of driving of the crane apparatus. Crane controller 31 transmits acquired these pieces of information to image processing controller 30.

Image processing controller 30 is electrically connected to display apparatus 33. In image processing controller 30, a viewpoint change video image (overhead video image) is generated on the basis of the information transmitted from crane controller 31. On display apparatus 33, either one of the overhead video image generated by image processing controller 30 and a taken usual video image (live video image), or both of these is displayed. An image to be displayed on display apparatus 33 is selectable. That is, display apparatus 33 is operated, so that the image to be displayed on the display apparatus is selectable from (1) usual video image, (2) overhead video image, or (3) both of these, as illustrated in FIG. 6. A video image of left camera 20 and a video image of right camera 21 may be displayed on display apparatus 33 at the same time.

Image processing controller 30 is electrically connected to notification apparatus 34. In image processing controller 30, the existence of an obstacle is recognized on the basis of respective video images transmitted from left camera 20 and right camera 21. When image processing controller 30 determines that the obstacle exists, an electric signal is transmitted to notification apparatus 34, and it is notified that the obstacle exists around crane 1 by a buzzer, an indicator, or the like. Notification apparatus 34 notifies the existence, so that a driver (or person that becomes an obstacle) can be reliably informed of approach of an obstacle, collision with the obstacle is easily avoided.

Image processing controller 30 further detects the approach of the obstacle, and transmits, to crane controller 31, a control signal to slowly stop or automatically stop the crane apparatus.

Next, an obstacle determination step performed in image processing controller 30 will be described with reference to FIG. 7.

First, information related to a condition of crane 1 is acquired. That is, information related to a position of PTO changeover switch 32 is acquired (Step S1), and information related to a position of luffing cylinder 8 is acquired, and the luffing angle of boom 7 is acquired (Step S2). With this, position coordinates of left camera 20 and right camera 21 are acquired from the luffing angle of boom 7 (Step S3). The position coordinates of the cameras are acquired, so that change from an original image to an overhead view image can be performed.

In Step S4, whether crane 1 is in a traveling state or an operation state is determined. Then, in Step S5, a video image to be displayed on display apparatus 33 is selected from an overhead video image or a usual video image (live video image taken by a camera). For example, in a case in which crane 1 is in the traveling state, a usual video image of left camera 20 can be displayed on display apparatus 33 at the time of turning left, or in a case in which crane 1 is in the operation state, an overhead video image of right camera 21 can be displayed on display apparatus 33 during swiveling right.

Thus, an obstacle (a person, a vehicle, or the like) is identified from the acquired camera video image (Step S6). In Step S7, whether or not the identified obstacle approaches crane 1 is determined. In a case in which the obstacle approaches (Step S7: Y), the approach is notified by notification apparatus 34 (Step S8).

In a case in which the obstacle further approaches, and there is a possibility of collision with crane 1 (Step S9: Y), operation of crane 1 is slowly automatically stopped (Step S10).

Figure 8:
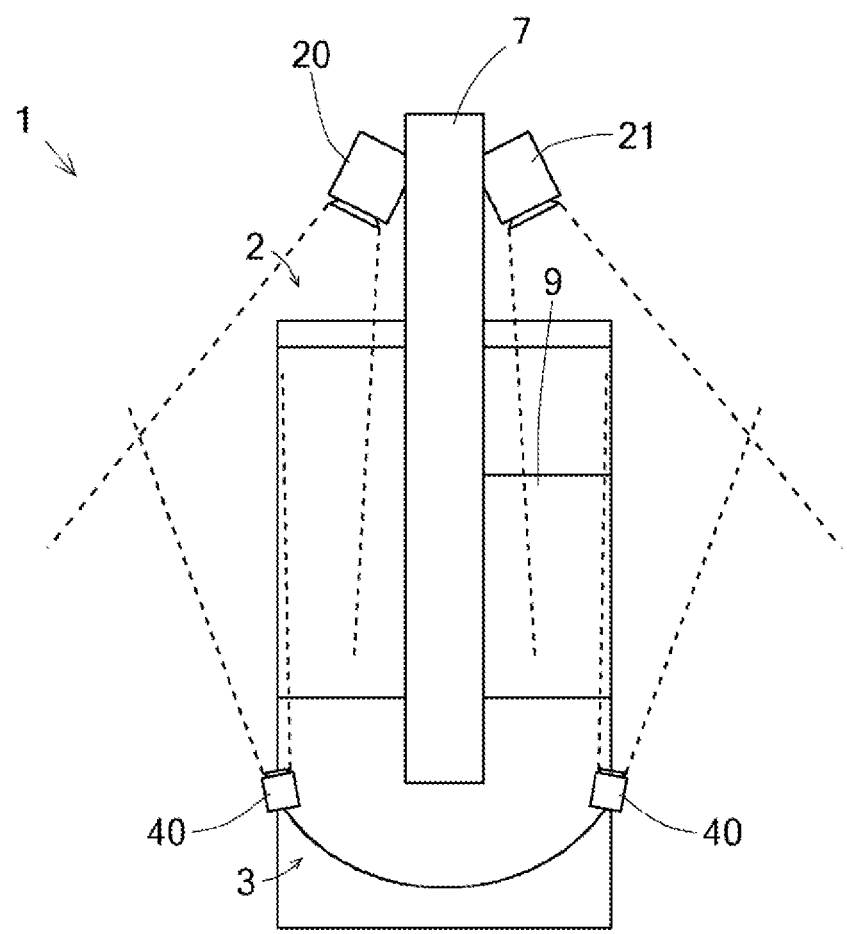
FIG. 8 is a diagram illustrating an embodiment of obstacle detection by a crane provided with obstacle sensors in a swivel body rear part.
Figure 9:
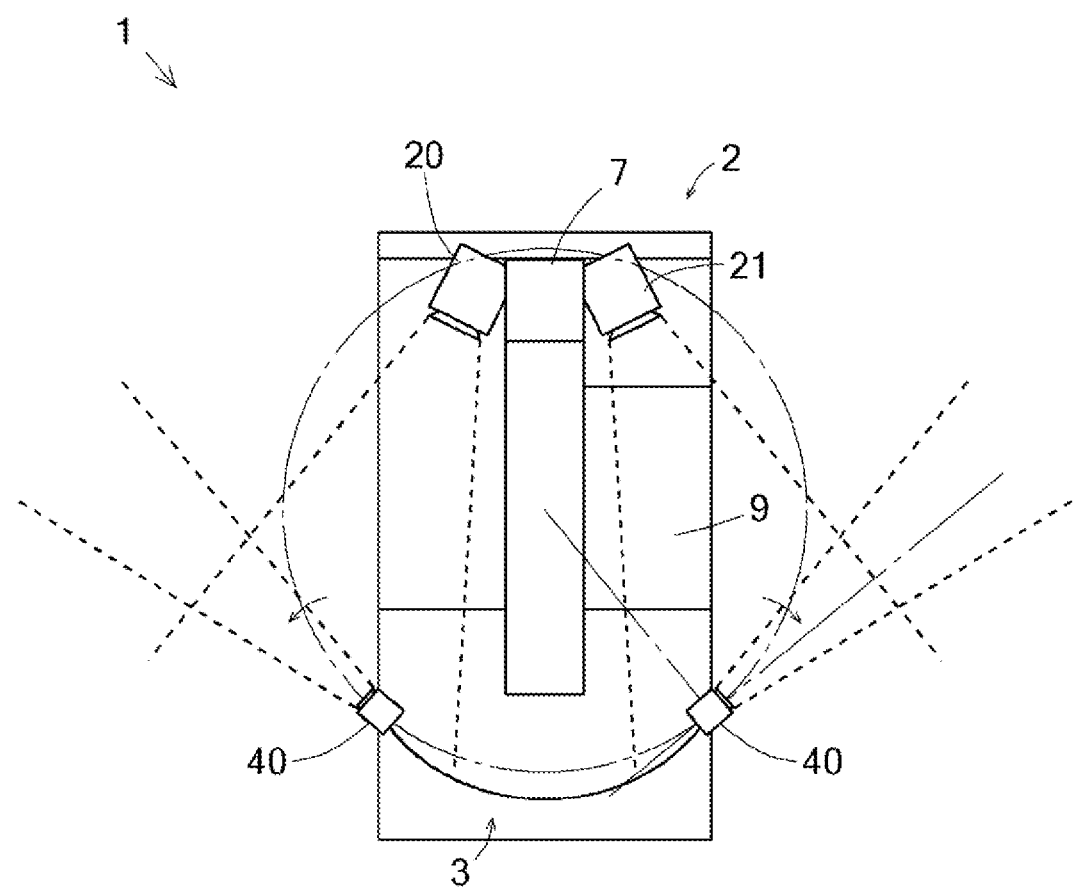
FIG. 9 is a diagram illustrating an embodiment of obstacle detection by the crane provided with the obstacle sensors in the swivel body rear part.
Figure 10:
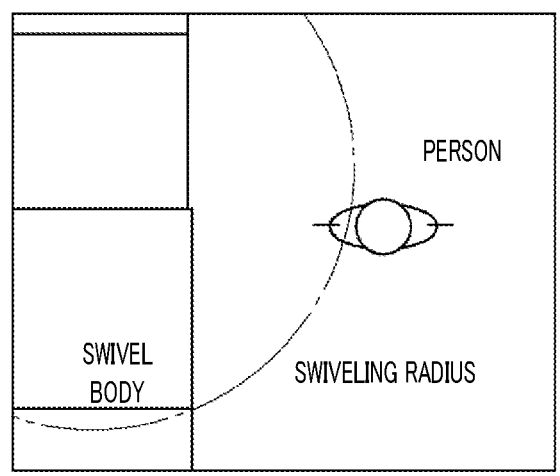
FIG. 10 is a diagram illustrating a display example of a display apparatus.

Next, another embodiment of obstacle detection around the crane will be described with reference to FIG. 8 to FIG. 10. FIG. 8 is a diagram illustrating a state of obstacle detection during traveling of crane 1 by rear cameras 40 provided in the rear part of swivel body 3. FIG. 9 is a diagram illustrating a state of obstacle detection during operation of crane 1 similarly. FIG. 10 is a diagram illustrating a display example of obstacle detection on the display apparatus.

As illustrated in FIG. 8, in crane 1, rear cameras 40 for acquiring video images of lateral sides of traveling body 2 and swivel body 3 are provided in both side ends of the rear part of swivel body 3, in addition to left camera 20 and right camera 21. Rear cameras 40 each are a third obstacle sensor provided in a rear end of swivel body 3, and are each disposed such that a image-taking range (detection range) thereof is a range from a side end of the rear part of swivel body 3 toward the outside of a machine body and toward a diagonally front side.

As illustrated in FIG. 8, during traveling of crane 1, rear camera 40 disposed on a rear right end of swivel body 3 detects an obstacle that exists in the periphery of right side surfaces of traveling body 2 and swivel body 3, and rear camera 40 disposed on a rear left end of swivel body 3 detects an obstacle that exists in the periphery of left side surfaces of traveling body 2 and swivel body 3. As illustrated in FIG. 9, during operation of crane 1, rear camera 40 disposed on the rear right end of swivel body 3 detects an obstacle that approaches the rear left part of swivel body 3 during right swiveling, and rear camera 40 disposed on the rear left end of swivel body 3 detects an obstacle that approaches the rear right part of swivel body 3 during left swiveling.

As illustrated in FIG. 9, during operation of crane 1, rear cameras 40 are each inclined in the tangential direction of a circle that becomes a swiveling locus during swiveling of a rear side end of swivel body 3 as an installation portion (circle illustrated by a long dashed short-dashed line). That is, during operation of crane 1, the image-taking direction is changed such that the detection range by each rear camera 40 is a range toward the moving direction of the rear part of swivel body 3, so that it is possible to more reliably detect contact between the rear part of swivel body 3 and an obstacle.

As described above, during traveling of crane 1, the image-taking ranges of rear cameras 40 are set near the front side, so that at the time of change of a course such as turning right or turning left, obstacles that exist on both lateral sides of crane 1 are easily detected. Additionally, during operation of crane 1, the image-taking ranges of rear cameras 40 are set near the lateral sides, so that an obstacle located in a swiveling range of swivel body 3 is easily detected. During swiveling, by rear camera 40 located on the same side as the swiveling direction, an obstacle that exists in a movement destination of boom 7 can be detected at early timing.

When operation by crane 1 starts, outriggers 6 of traveling body 2 is installed, and boom 7 is luffed up. That is, the installation of outriggers 6 or the start of the operation of boom 7 is used as a trigger of the operation start, and upon receipt of the trigger, each rear camera 40 is inclined toward the lateral side, and the detection range can be changed.

Rear cameras 40 are each electrically connected to image processing controller 30, and acquired video image data is transmitted to image processing controller 30. Image processing controller 30 identifies an obstacle such as a person and a vehicle included in video images taken by rear cameras 40, by image processing, and suitably transmits an electric signal to crane controller 31, display apparatus 33, and notification apparatus 34. On display apparatus 33, live video images acquired by rear cameras 40 can be displayed. For example, as illustrated in FIG. 10, the swiveling radius of swivel body 3 (swiveling locus of the rear end lateral part of swivel body 3) can be displayed so as to be superimposed on an overhead view image.

As described above, crane 1 includes rear cameras 40, 40 having detection ranges from both side ends of the rear part of swivel body 3 toward diagonally front sides, in addition to left camera 20 and right camera 21 having detection ranges from the distal end of boom 7 toward the diagonally rear sides. Thus, surrounding monitoring from the front by the obstacle sensors having the detection ranges from the front to the rear, and surrounding monitoring from the rear by the obstacle sensors having the detection ranges from the rear to the front are performed at the same time, so that an obstacle can be more reliably detected, and contact between crane 1 and an obstacle can be more easily avoided.

As described above, according to a further feature of the present crane, third obstacle sensors that detect obstacles on both lateral sides of the traveling body and the swivel body from rear ends of the swivel body toward diagonally front sides are provided, and the third obstacle sensors each detect approach of an obstacle toward a front side part of the traveling body, during traveling, and detect approach of an obstacle toward a rear side part of the swivel body, during operation.

Thus, according to the third obstacle sensors having the detection ranges from the swivel body rear ends toward the diagonally front sides, that is, from the rear to the front, during traveling in the luffed-down state of the boom, the lateral sides of the traveling body and the swivel body from the rear are detected, so that existence of an obstacle at the time of change of a course of the traveling body is satisfactorily detected. Additionally, during operation in the luffed-up state of the boom, the lateral sides of the swivel body are detected, so that existence of an obstacle can be satisfactorily detected when the swivel body swivels.

Furthermore, in each of the third obstacle sensors, the detection range from the rear end of the swivel body toward the diagonally front side is preferably inclined in the tangential direction of the circle as the swiveling locus of the rear lateral end of the swivel body at the time of start of operation. Thus, the detection range is inclined toward the swiveling locus of the rear end of the swivel body, so that it is possible to satisfactorily avoid collision with the swivel body.

Rear cameras 40 are preferably disposed on both the right and left sides of swivel body 3, similarly to left camera 20 and right camera 21. However, a configuration in which only rear camera 40 located on a side opposite to a side on which cabin 9 is provided, that is, left rear camera 40 is disposed, and a region that is difficult to be visually observed from cabin 9 is monitored may be employed.

Figure 11:
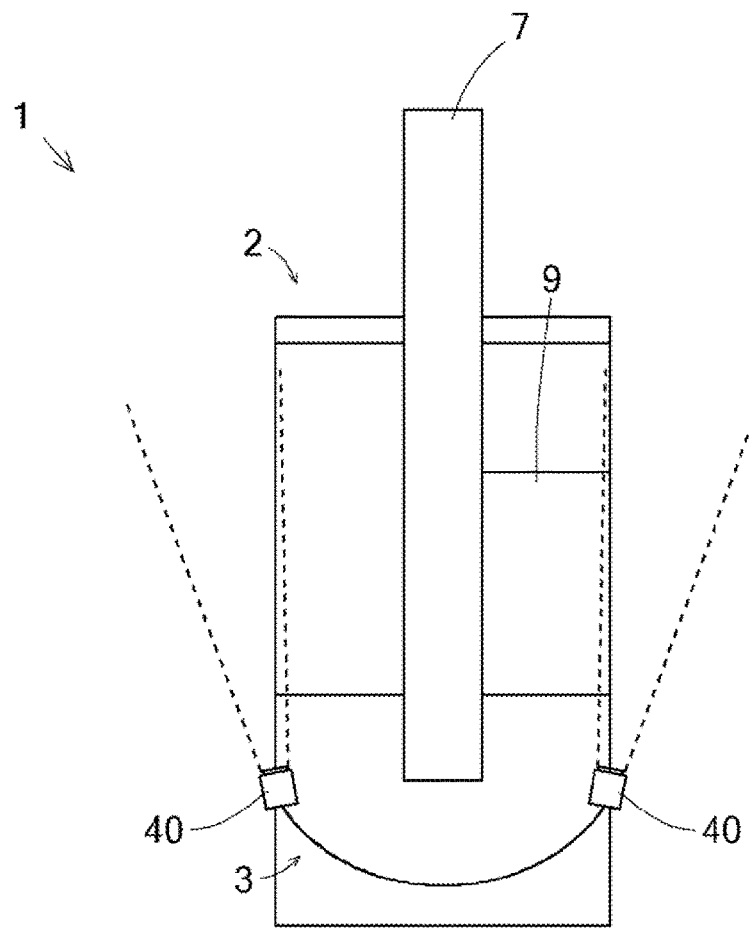
FIG. 11 is a diagram illustrating another embodiment of the crane.
Figure 11:
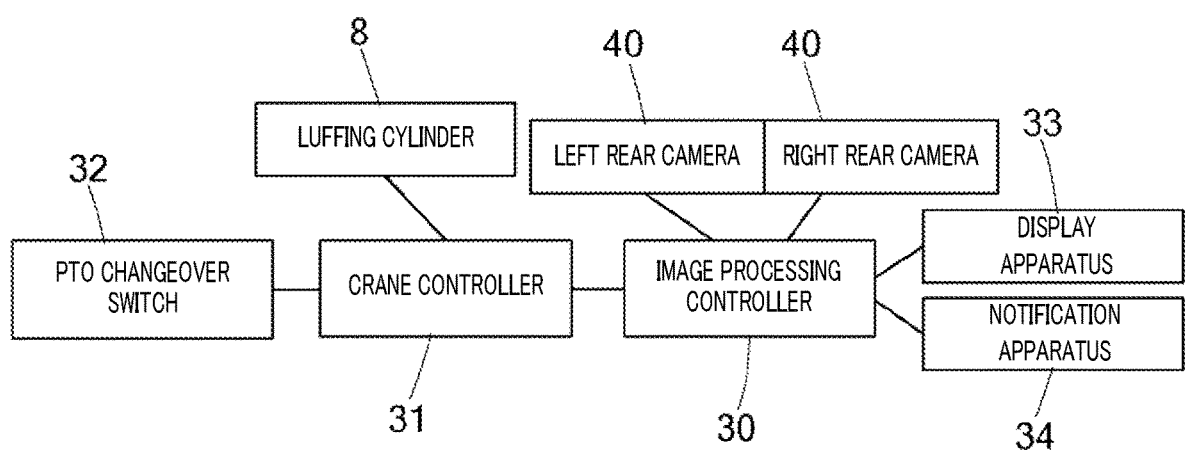

As described above, rear cameras 40 can perform obstacle detection in a sufficient range during traveling and during operation, and therefore a configuration in which surrounding monitoring is performed by using only rear cameras 40 may be employed, as illustrated in FIG. 11. The obstacle determination step in surrounding monitoring at this time is similar to the above.

As described above, a feature of the present crane including: a traveling body, a swivel body; a boom provided so as to protrude forward from a central rear part of the swivel body, and provided so as to be able to be freely lulled by a hydraulic actuator; and a driver's seat disposed on a single side of the boom, in which third obstacle sensors that detect obstacles on both lateral sides of the traveling body and the swivel body from rear ends of the swivel body toward diagonally front sides are provided, and the third obstacle sensors each detect approach of an obstacle toward a front side part of the traveling body, during traveling, and detect approach of an obstacle toward a rear side part of the swivel body, during operation.

Thus, according to the third obstacle sensors having the detection ranges from the swivel body rear ends toward the diagonally front sides, the lateral sides of the traveling body and the swivel body from the rear are detected during traveling in the luffed-down state of the boom, so that existence of an obstacle at the time of change of a course of the traveling body is satisfactorily detected. Additionally, during operation in the luffed-up state of the boom, the lateral sides of the swivel body are detected, so that existence of an obstacle can be satisfactorily detected when the swivel body swivels.

Figure 12:
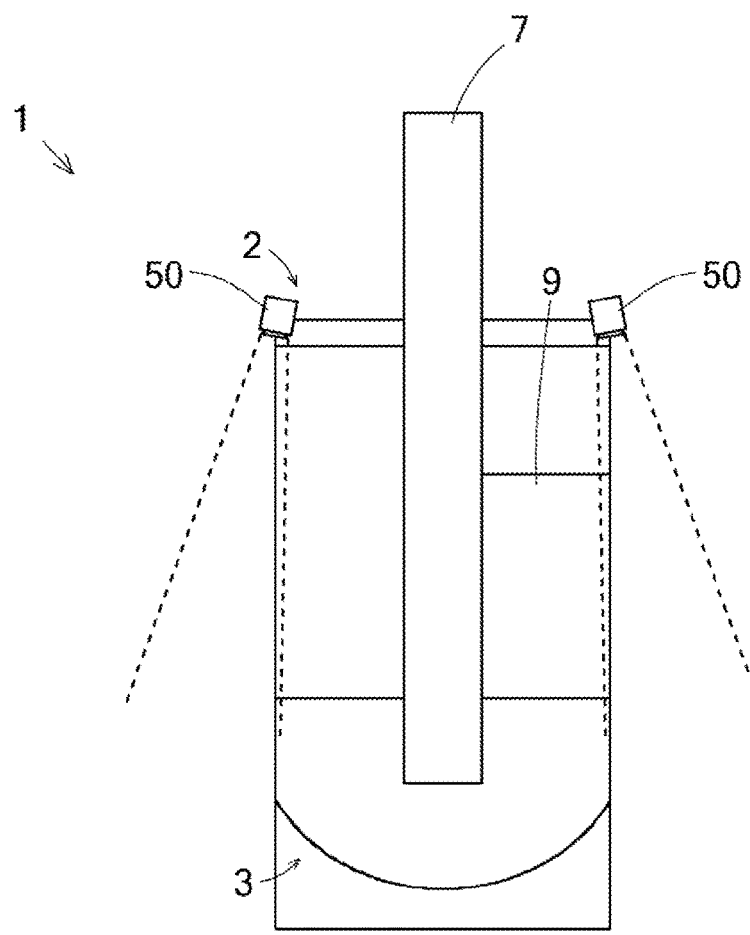
FIG. 12 is a diagram illustrating still another embodiment of the crane.
Figure 12:
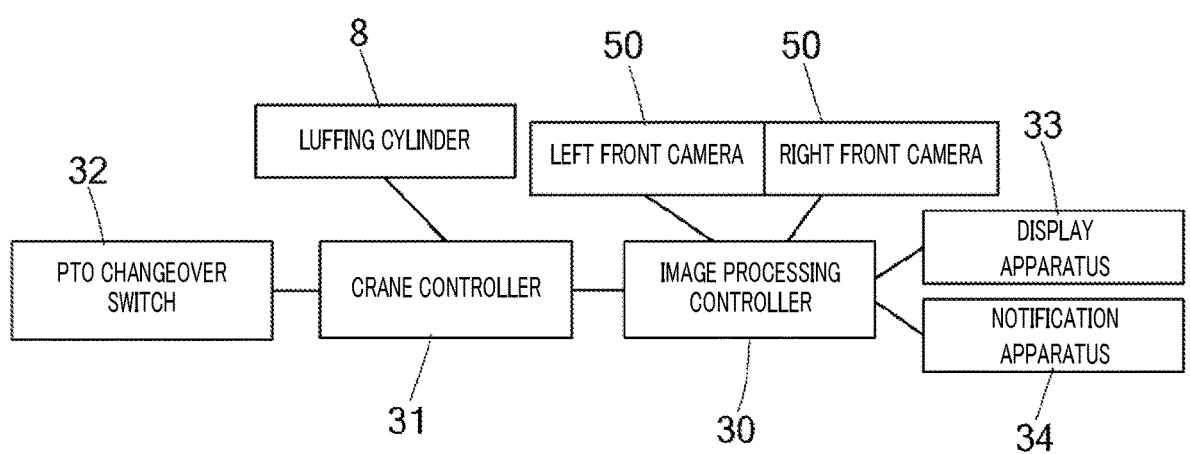

Next, still another embodiment of obstacle detection of crane surroundings by use of obstacle sensors having detection ranges from front to rear will be described with reference to FIG. 12. FIG. 12 is a diagram illustrating a state of obstacle detection of crane 1 by front cameras 50 provided on both sides of a front part of traveling body 2.

As illustrated in FIG. 12, front cameras 50 are provided on both right and left sides of a front end of traveling body 2. Front cameras 50 are disposed toward the diagonally rear sides on the outside of a machine body in the front end of traveling body 2. Front cameras 50 each are an image-taking apparatus for acquiring a video image of lateral sides of traveling body 2 and swivel body 3, and each has an image-taking range (detection range) from front to rear. Front cameras 50 can be provided, for example, in the vicinity of side mirrors provided in the front end of traveling body 2.

By right and left front cameras 50 thus disposed, during traveling and during operation of crane 1, obstacles that exist around both right and left side surfaces of traveling body 2 and swivel body 3 are detected. An obstacle determination step of surrounding monitoring at this time is similar to the above. Front cameras 50 are preferably disposed on both right and left sides of swivel body 3 similarly to left camera 20 and right camera 21. However, a configuration in which only front camera 50 located on a side opposite to a side on which cabin 9 is provided, that is, left front camera 50 is disposed, and a region that is difficult to be visually observed from cabin 9 is monitored may be employed.

In the aforementioned embodiment, the respective cameras as the obstacle sensors are disposed on side ends of traveling body 2 or swivel body 3. However, for example, a wide-angle camera may be provided in a lateral central part of swivel body 3, and monitoring areas on both lateral sides of traveling body 2 and swivel body 3 may be included in a detection range.

In the above embodiments, the cameras that are the image-taking apparatuses are employed as the obstacle sensors. However, sensors generally used as obstacle sensors such as distance sensors, infrared sensors, or the like having similar detection ranges can be used instead into a configuration of detecting approach of an obstacle, and notifying the approach.

INDUSTRIAL APPLICABILITY

The present invention can be used for a crane.

REFERENCE SIGNS LIST

1 Crane
2 Traveling body
3 Swivel body
7 Boom
9 Cabin
20 Left camera (obstacle sensor)
21 Right camera (obstacle sensor)
30 Image processing controller
31 Crane controller
33 Display apparatus
34 Notification apparatus
40 Rear camera (obstacle sensor)
50 Front camera (obstacle sensor)

The invention claimed is:

1. A crane, comprising an obstacle sensor that detects approach of an obstacle toward a front side part of a traveling body during traveling, and detects approach of an obstacle toward a rear side part of a swivel body on the traveling body during operation; and
  a boom that is provided on the swivel body and is put into a state where the boom is luffed down forward during traveling and put into a state where the boom is luffed up during operation, wherein
  the obstacle sensor includes a camera that is provided at a distal end of the boom at an angle such that an image-taking range thereof is turned into a range directed from a front side toward a lateral side of the traveling body and the swivel body during traveling and into a range directed from an upper side toward the traveling body and the swivel body during operation.

2. The crane according to claim 1, wherein the distal end of the boom, to which the camera is provided, is located at a forward side of a front end of the traveling body when in the state where the boom is luffed down forward.

3. The crane according to claim 1, wherein the obstacle sensor includes a further camera having a detection range from rear to front.

4. The crane according to claim 1, wherein the obstacle sensor includes a further camera that is provided at a side end of a rear part of the swivel body and that is inclined in a tangential direction of a circle that becomes a swiveling locus during swiveling of the side end of the swivel body.

5. The crane according to claim 4, wherein the further camera is disposed to face forward such that a lateral part of the traveling body and the swivel body is included in the image-taking range during traveling.

\* \* \* \* \*